United States Patent [19]

Stahl et al.

[11] Patent Number: 5,110,611
[45] Date of Patent: May 5, 1992

[54] PROCESS FOR EXTRUDING A WET MATERIAL

[75] Inventors: Werner Stahl, Stalbühlweg 8, D-6740 Landau; Hans Buggisch, Malsch-Waldprechtsweiher, both of Fed. Rep. of Germany

[73] Assignee: Werner Stahl, Landau, Fed. Rep. of Germany

[21] Appl. No.: 502,277

[22] Filed: Apr. 2, 1990

[51] Int. Cl.⁵ .............................................. A23P 1/00
[52] U.S. Cl. ..................................... 426/512; 426/516
[58] Field of Search ............... 426/512, 516, 285, 496; 425/331, 376.1, 381.2, 382.2, DIG. 230; 100/903

[56] References Cited

U.S. PATENT DOCUMENTS

| 521,810 | 6/1894 | Perky | 425/331 |
| 2,171,039 | 8/1939 | Meakin | 425/331 |
| 4,422,372 | 12/1983 | Hoezee | 426/516 |

Primary Examiner—George Yeung
Attorney, Agent, or Firm—Fleit, Jacobson, Cohn, Price, Holman & Stern

[57] ABSTRACT

A process and an apparatus for extruding or pressing out a wet material is described, in which the material is forced through a perforated plate, while exerting a pressure. Apart from the contact pressure, the material is subject to the action of a shear force, which acts substantially at right angles to the material conveying direction.

6 Claims, 1 Drawing Sheet

PROCESS FOR EXTRUDING A WET MATERIAL

BACKGROUND OF THE INVENTION

The invention relates to a process for extruding or pressing out a wet or moist material, such as a filter cake, a paste, a feedstuff, etc. from openings and in particular for granulating a paste, in which the material is conveyed through at least one opening using a predeterminable contact pressure. The invention also relates to an apparatus for performing the inventive process, in which the material is conveyed through at least one opening with the aid of a conveying means.

Such a process and a corresponding apparatus are known from the journal "Chemie-Ingenieur-Technik", 49 (1977), No. 5, pp. 374 to 380.

Although the known apparatus functions correctly, it suffers from various disadvantages. Thus, the openings in the perforated plate tend to increasingly become blocked in operation. This tendency occurs independently at different individual openings. If no further paste is extruded over several pressing processes, the paste dries from the outside of the perforated plate. As a result a relatively strong connection is formed between the paste and the perforated plate and in particular with the edge of the holes. If such a paste attachment takes place, there is virtually no chance of self cleaning of said hole.

If a larger number of holes become clogged, the following drying means, e.g. a belt dryer becomes non-uniformly covered. Thus, short-circuit flows of the hot air occur with all the problems known from the prior art and referred to in the aforementioned publication. In most cases the perforated plate must be cleaned with a high pressure water jet during an operational stoppage.

There are various ways in which the openings in the perforated plate can become clogged. The more rigid lumps may come from an upstream filter and have not been correctly mixed by stirring, so that the mass is not sufficiently homogeneous. It is also possible that in the case of coarser particles in the mass or paste a self-supporting dome may form over an opening in the perforated plate. Then, when the contact pressure is applied, the mass will only deliver liquid through the dome, which leads to a further local thickening of the mass causing a more intense self-locking effect.

As fundamentally any mass or material has a certain initial shear stress, it is not possible to move a press die or displacement body up to the perforated plate with a zero spacing. A relatively narrow zone filled with material is always left between the perforated plate and a press die or a displacement body. In other words between the pres die or displacement body and the perforated plate there is always material which cannot flow.

In a very large number of cases a so-called paste deformer, i.e. an apparatus for performing the inventive process of the aforementioned type is placed between a filter and a belt dryer, but then the following problem occurs. In order to save thermal energy in the dryer, every effort is naturally made to mechanically dry the material or paste of the filter to the greatest possible extent. However, there is a definite limit to the carrying out of corresponding measures, because the material or paste becomes more rigid with decreasing moisture content. Finally, with increasing toughness, it can arise that it is no longer possible to press the material through the openings in a perforated plate. However, a relatively tough paste could still be extruded through a perforated plate if the openings in the latter were sufficiently large. However, there is a fundamental requirement of operating with openings which are as small as possible. Due to the dispersability of the paste and the drying speed in the following drying process, it is necessary to work with minimum sized openings in the perforated plate.

It would fundamentally also be possible to liquefy the paste after taking from the filter by applying mechanical energy (stirring and/or mixing), but then the initial shear stress would drop to such an extent that the paste would drip in liquid form through the perforated plate and no aeratable heap would form on the belt dryer.

SUMMARY OF THE INVENTION

The object of the invention is to provide a process and an apparatus of the aforementioned type making it possible substantially simultaneously with the extrusion of the moist material and certainly in the same operation, to control the consistency of the moist material with a view to optimum extrusion conditions, so that it is possible to preset a predeterminable initial shear stress for the extrusion process.

According to the invention this object is achieved in that, besides the contact pressure, the material is subject to the action of a shear force, which acts on the material under a predeterminable angle relative to the conveying means.

In addition, a motor means is provided, which brings about a relative movement between the conveying means and the opening at a predeterminable angle to the conveying direction.

Thus, the invention which has been defined as regards object and solution provides the art with a completely new way through which in a paste deformer the paste firstly undergoes a consistency change, i.e. a clearly defined initial shear stress is selected and predetermined, whilst subsequently the paste is extruded at a clearly defined and sufficiently low initial shear stress. Thus, the invention overcomes the disadvantage of known paste deformers, which was that although moist or wet materials could be extruded, it depended on the paste deformer construction as to what amount of shearing and therefore liquefaction could be used on a paste. Thus, it was not possible with conventional processes and apparatuses to initially bring about a planned consistency change and then subsequently extrude at a clearly defined initial shear stress.

Therefore the invention makes use of the finding that it is possible in one operation and in one apparatus to separate the function of a clearly defined liquefaction, i.e. consistency change, from the extrusion function.

Thus, the invention enriches the art in that the possibility is created of combining the two processes of a paste consistency change on the one hand and the extrusion through openings on the other in a single operation and in a single apparatus.

The invention leads to the essential advance in the arts that a wet material can be mechanically dried to the greatest possible extent on a filter, that subsequently in an inventive paste deformer a material which is in itself too rigid for the deformation process can be extruded in problem-free manner and that finally in this way on the following belt drier and with relatively limited thermal energy costs for drying purposes, highly suitable product forms can be economically subsequently dried.

Advantageous further development and preferred embodiments of the invention can be gathered from the subclaims.

Preferably the shear force acts substantially at right angles to the conveying direction of the material. Advantageously the shear force is intermittently applied, in that a reciprocating shear movement in the shearing area of the mass is brought about, which is either in the form of a harmonic oscillation or a rectangular or trapezoidal movement. This movement can be performed either symmetrically or asymmetrically. Preferably the amplitude and/or frequency of the shear movement are variable. Both the frequency and the amplitude should be continuously adjustable preferably separately from one another.

According to the invention on the movement which brings about the extrusion of the wet material through the openings is superimposed a further movement, which is preferably at right angles to the conveying direction of the wet material. This additional movement, which is preferably an oscillatory movement, leads to two additional degrees of freedom, namely the amplitude and frequency of said additional movement. Whilst the conveying process can take place as hitherto, due to the additional superimposed movement according to the invention a liquefaction process is initiated independently of the conveying process and as a result the wet material consistency can be controlled by a corresponding choice of the movement parameters. Thus, the invention leads to the essential advantage that the liquefaction process is separated from the conveying process.

A preferred equipment embodiment of the invention is characterized in that the motor is constructed as a vibrator, through which the conveying means is moved substantially at right angles to the conveying direction.

In an alternative, advantageous embodiment the motor can be constructed as a hydraulic motor with a double-acting lifting cylinder.

According to another advantageous apparatus variant the motor is constructed as an unbalanced drive.

Preferably and in preferred manner the arrangement is such that on one side of the conveying means the motor has a crank mechanism gear and on the other side a pivoting drive.

Independently of the aforementioned preferred embodiments of the invention, according to the basic principle of the invention it is important that the conveying movement through which a moist material is conveyed through openings in a perforated plate has a further movement superimposed on it substantially at right angles to said conveying direction, which can be performed continuously or discontinuously in reciprocating manner, harmonically or disharmonically, in gyratory or oscillatory or in some other manner. The basic principle of the invention is always achieved if a further movement is superimposed on the conveying movement at an angle to the conveying direction and which is suitable for influencing the consistency of a wet material and also the initial shear stress of the latter.

The invention is described in greater detail hereinafter relative to the drawings.

DESCRIPTION OF THE PREFERRED EMBODIMENT

Figure 1:
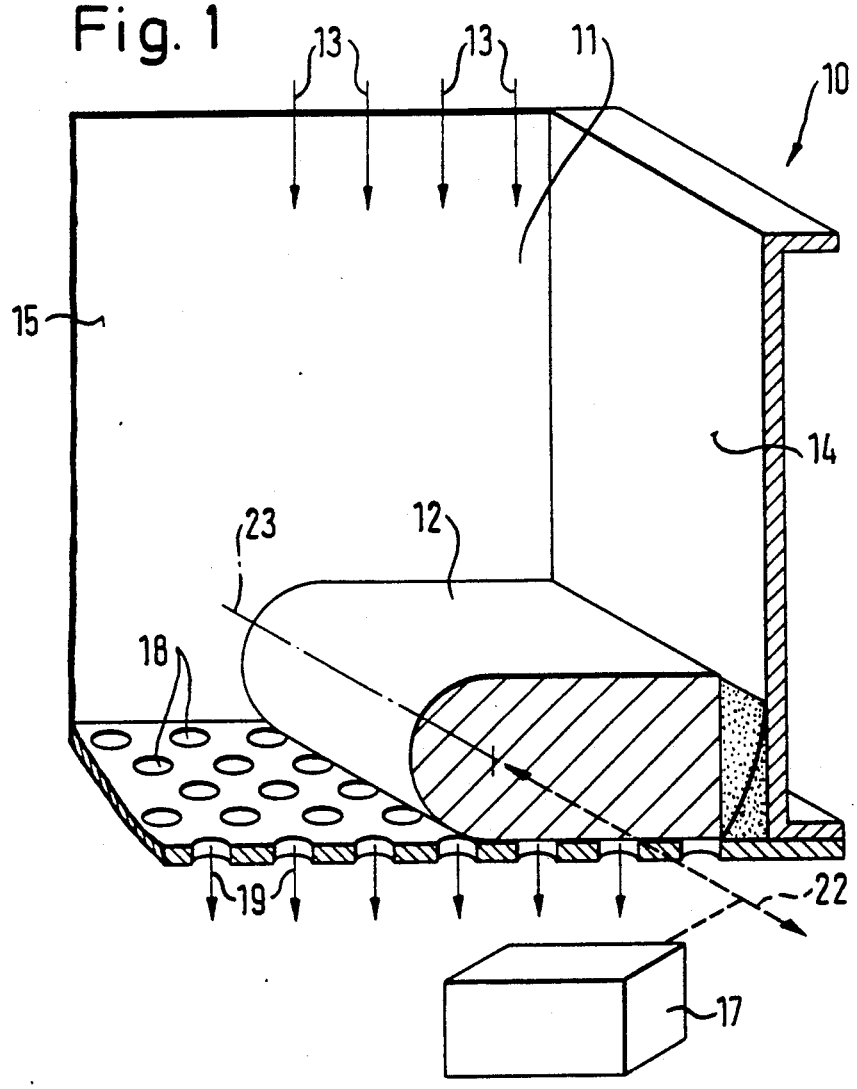
FIG. 1 is a partial section through a paste granulator according to the invention.

FIG. 1 diagrammatically shows in a partial section a paste granulator 10 according to the invention, which positively extrudes a paste over the full working width. The continuously obtained wet material, e.g. a paste, is supplied to the paste granulator 10 by means of a drop shaft 11. The wet material is supplied from above, as illustrated by arrows 13. The wet material passes into the drop shaft 11, which is bounded by a side wall 14 and by a rear wall 15. The bottom of the paste granulator 10 has a perforated plate 16, in which there are openings 18.

In the lower region of the paste granulator 10 is fitted a displacement body 12, which can be reciprocated about a pivot axis 23. FIG. 1 shows the displacement body 12 in its right-hand reversing position. Due to the pivoting movement of the displacement body 12 shortly prior to reversal a partial volume of material introduced from above into the drop shaft 11 is enclosed. This partial volume is bounded by the displacement body 12, the shaft side wall 14 and the perforated plate 16. During the movement of the displacement body 12 in to the reversing position shown in FIG. 1, the partial volume of wet material is reduced and the enclosed paste is extruded through the openings 18 in perforated plate 16 in the form of small sausages in the direction of the arrows 19. After reversing the rotation direction of the displacement body 12, the now free right-hand part of the drop shaft is again filled with wet material, whilst on the other, left-hand side the aforementioned extrusion process takes place. Naturally the idle stroke until the pressing process starts can take place in a rapid return motion, whilst the extrusion process takes place at a lower speed of movement of the displacement body 12.

According to the invention a motor 17 is provided, which is diagrammatically shown in FIG. 1, and in parts to the displacement body 12 along its pivot axis 23 a reciprocating oscillatory movement. This movement performed according to the invention and which is superimposed on the pivoting movement necessary for extruding the paste, is illustrated in FIG. 1 by the broken double arrow 22.

The arrangement could be such that the displacement body is mounted in very wide roller bearings without lateral guidance. The antifriction bearings (rollers) could then still slide axially backwards and forwards during the pivoting movement.

Figure 2:
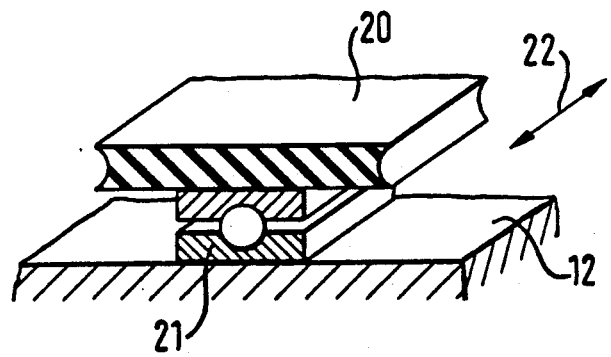
FIG. 2 is a diagrammatic partial section through an anti-friction bearing permitting the inventive movement superimposition.

However, preferably the bearing is constructed as a swivel bearing and the axial degree of freedom in the direction of double arrow 22 results from the fact that a further component, e.g. a rubber block is used, which is non-rigid in the axial direction and is rigid in a radial direction at right angles thereto. FIG. 2 illustrates such a rubber block 20 in conjunction with a diagrammatically represented antifriction bearing 21. Whilst the pivoting movement necessary for extruding the paste can be brought about with the aid of the antifriction bearing 21, the superimposed transverse movement according to double arrow 22 is brought about by the elasticity of rubber block 20, which is relatively soft in the direction of double arrow 22, so as to permit a reciprocating oscillatory movement of displacement body 12.

However, the invention is not limited to a specific technological construction of the bearing or mounting support, so that it is also possible to use e.g. friction bearing bushes as a relatively simple and robust construction for the combined movement according to the invention. It falls within the activity of the Expert to choose for a particular application and construction of a paste granulator the most suitable bearing for the same.

However, the invention provides the possibility of locally "liquefying" by vibration a very stiff filter cake to such an extent that despite the greatly increased strength and toughness of a particularly dry filter cake perforated plates can be used with relatively small openings, so that relatively thin sausages can be squeezed out of the perforated plate and which are particularly suitable for subsequent drying.

According to the invention the clogging risk is eliminated in that a product layer between individual openings of a perforated plate is liquefied and extruded before it can solidify. Thus, the invention leads to a surprising self-cleaning effect.

It can be appropriate not to maintain over the entire pivoting area the shear movement of the displacement body 12 according to double arrow 22 and instead to only start it just prior to the approach of this displacement body 12 to the perforated plate 16. It is sufficient if a partial volume of the wet material is enclosed between the displacement body 12, the shaft side wall 14 and the perforated plate 16. Only then can the vibration according to double arrow 22 be put into effect Thus, the inventive shearing movement starts just in time to liquefy the final thin layers of wet material. Thus, apart from the aforementioned amplitude and frequency, this leads to a further variable, which can be adjusted as a function of the product namely the ratio of the pivoting angle with vibration to the pivoting angle without vibration.

If the pivotable displacement body 12 is hydraulically driven, then the pressure rise shortly before the dead centre of the pivoting movement can be used as a signal for initiating the inventive shearing movement.

As according to the invention it is only a question of the relative movement between the displacement body 12 on the one hand and the perforated plate 16 on the other, the fundamental idea of the invention can also be realised in a kinematic reversal in that the perforated plate 16 is moved. It is a question of the equipment circumstances of the particular case whether it is considered more appropriate to move the displacement body 12 relative to the perforated plate 16 or, in a kinematic reversal, to move the perforated plate 16 relative to the displacement body.

It also falls within the routine activity of the Expert to establish whether there is to be a rotatory shearing movement in place of a translatory shearing movement.

Finally, the realisation of the inventive principle is not bound by the paste granulator embodiment illustrated in FIG. 1. Thus, the invention can be used in the same way in other paste deformers, as mentioned in the aforementioned publication and in particular as illustrated diagrammatically in FIG. 13 of said publication.

Finally, the basic idea of the invention can be used in general terms in the pressing out or extruding of sausages from openings such as occurs in numerous industrial processing technology branches, where a superimposed shearing movement is produced apart from a contact pressure. For example, animal feed is extruded via perforated plates with edge mills. The invention can naturally advantageously be used here, in that the shearing movement according to the invention is initiated at right angles to the extrusion or conveying direction, e.g. by vibrating the perforated plate.

Thus, the invention enriches all fields of technology in which, during the pressing out or extrusion of a pasty material, the consistency of the latter is favourably influenced by a shearing movement superimposed on the conveying movement.

What we claim is:

1. A process for pressing out and extruding a wet filter cake, paste or feedstuff material, said process comprising the steps of pressing the material through at least one opening of a perforated plate with a predetermined force by means of a first movement of a displacement body acting on said material, and exerting a shear force on the material by means of a second movement of the displacement body generated independently from the first movement causing the material to undergo liquefaction prior to the pressing step.

2. A process according to claim 1, wherein the shear force acts on the material substantially at right angles to a direction in which the material is conveyed.

3. A process according to claim 1, wherein the shear force is applied intermittently.

4. A process according to claim 1, wherein a reciprocating shearing movement is brought about the shear force in a shearing area of the material and at an angle to a direction in which the material is conveyed.

5. A process according to claim 4, wherein the shearing movement is performed int eh manner of a harmonic oscillation.

6. A process according to claim 4, wherein at least one of an amplitude and a frequency of the shearing movement is variable.

* * * * *